(12) United States Patent
Maloney et al.

(10) Patent No.: US 11,010,034 B2
(45) Date of Patent: May 18, 2021

(54) AUTOMATIC PRESENTATION OF SLIDE DESIGN SUGGESTIONS

(71) Applicant: Microsoft Technology Licensing, LLC, Redmond, WA (US)

(72) Inventors: Christopher Maloney, San Francisco, CA (US); John Schilling, Seattle, WA (US); Jonathan Chung, Bellevue, WA (US); Andrew Kunz, San Mateo, CA (US); Sharena Pari-Monasch, San Jose, CA (US); Jonathan Ko, Santa Clara, CA (US); Onur Onder, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/850,191

(22) Filed: Dec. 21, 2017

(65) Prior Publication Data

US 2018/0217742 A1    Aug. 2, 2018

Related U.S. Application Data

(63) Continuation of application No. 13/925,114, filed on Jun. 24, 2013, now Pat. No. 10,282,075.

(51) Int. Cl.
*G06F 3/048* (2013.01)
*G06F 3/0484* (2013.01)
*H04N 1/00* (2006.01)

(52) U.S. Cl.
CPC ..... *G06F 3/04847* (2013.01); *H04N 1/00183* (2013.01); *H04N 1/00196* (2013.01); *H04N 1/00198* (2013.01)

(58) Field of Classification Search
None
See application file for complete search history.

(56) References Cited

U.S. PATENT DOCUMENTS

| 5,499,366 A | 3/1996 | Rosenberg et al. |
| 5,909,689 A | 6/1999 | Van Ryzin |

(Continued)

FOREIGN PATENT DOCUMENTS

| CN | 1794228 A | 6/2006 |
| CN | 1828587 A | 9/2006 |

(Continued)

OTHER PUBLICATIONS

"Non Final Office Action Issued in U.S. Appl. No. 15/081,111", dated Nov. 14, 2018, 14 Pages.

(Continued)

*Primary Examiner* — William C Trapanese
(74) *Attorney, Agent, or Firm* — Merchant & Gould (57) ABSTRACT

A method and system for organizing slides by analyzing content and offering alternative solutions for placing content on the slides in an effective and visually interesting organization is provided. The presentation application automatically generates alternative design suggestions for the provided content that effectively utilize the slide space pursuant to analytics performed on the content. Providing alternative design suggestions for organizing content on a slide assists in quickly and easily creating presentations that effectively utilize slide space.

20 Claims, 10 Drawing Sheets

(56) References Cited

U.S. PATENT DOCUMENTS

| | | | |
|---|---|---|---|
| 6,035,323 | A | 3/2000 | Narayen et al. |
| 6,081,262 | A | 6/2000 | Gill et al. |
| 6,192,518 | B1 | 2/2001 | Neal |
| 6,983,068 | B2 | 1/2006 | Prabhakar et al. |
| 7,039,229 | B2 | 5/2006 | Lin et al. |
| 7,171,042 | B2 | 1/2007 | Hartmann et al. |
| 7,194,134 | B2 | 3/2007 | Bradshaw |
| 7,346,627 | B2 | 3/2008 | Ramanathan et al. |
| 7,383,509 | B2 | 6/2008 | Foote et al. |
| 7,386,791 | B2 | 6/2008 | Jacobson |
| 7,500,194 | B2 | 3/2009 | Collins et al. |
| 7,577,905 | B2 | 8/2009 | Collins et al. |
| 7,620,665 | B1 | 11/2009 | George et al. |
| 7,716,332 | B1 | 5/2010 | Topfl et al. |
| 7,860,305 | B2 | 12/2010 | Wang et al. |
| 8,024,658 | B1 | 9/2011 | Fagans et al. |
| 8,214,742 | B2 | 7/2012 | Pratt |
| 8,416,255 | B1 | 4/2013 | Gilra |
| 8,418,059 | B2 | 4/2013 | Kitada |
| 8,478,799 | B2 | 7/2013 | Beaverson et al. |
| 8,560,952 | B2 | 10/2013 | Collins et al. |
| 8,655,111 | B2 | 2/2014 | Berger et al. |
| 8,745,158 | B2 | 6/2014 | Claman et al. |
| 8,775,918 | B2 | 7/2014 | Livshin et al. |
| 8,799,829 | B2 | 8/2014 | Grosz et al. |
| 8,890,886 | B2 | 11/2014 | Kriese et al. |
| 8,924,376 | B1 | 12/2014 | Lee |
| 9,177,225 | B1 | 11/2015 | Cordova-Diba et al. |
| 9,280,613 | B2 | 3/2016 | Smith et al. |
| 9,330,437 | B2 | 5/2016 | Berglund et al. |
| 9,400,610 | B1 | 7/2016 | Wallace et al. |
| 9,400,801 | B1 | 7/2016 | Aplemakh et al. |
| 9,715,485 | B2 | 7/2017 | Roth et al. |
| 9,824,291 | B2 | 11/2017 | Maloney et al. |
| 2002/0102018 | A1 | 8/2002 | Lin et al. |
| 2002/0186236 | A1 | 12/2002 | Brown et al. |
| 2002/0194227 | A1 | 12/2002 | Day et al. |
| 2003/0037010 | A1 | 2/2003 | Schmelzer |
| 2004/0001106 | A1 | 1/2004 | Deutscher et al. |
| 2004/0034829 | A1 | 2/2004 | Ohashi et al. |
| 2004/0243930 | A1 | 12/2004 | Schowtka et al. |
| 2005/0100223 | A1 | 5/2005 | De Queiroz |
| 2005/0108619 | A1 | 5/2005 | Theall et al. |
| 2005/0171758 | A1 | 8/2005 | Palmquist |
| 2006/0036965 | A1 | 2/2006 | Harris et al. |
| 2006/0103891 | A1* | 5/2006 | Atkins ............... H04N 1/00132 358/450 |
| 2006/0126932 | A1 | 6/2006 | Eschbach |
| 2006/0136520 | A1 | 6/2006 | Leppinen et al. |
| 2006/0136827 | A1 | 6/2006 | Villaron et al. |
| 2006/0156218 | A1 | 7/2006 | Lee |
| 2006/0220983 | A1 | 10/2006 | Isomura et al. |
| 2006/0259858 | A1 | 11/2006 | Collins et al. |
| 2006/0282779 | A1 | 12/2006 | Collins et al. |
| 2006/0294046 | A1 | 12/2006 | Sareen et al. |
| 2007/0019924 | A1 | 1/2007 | Teo et al. |
| 2007/0185926 | A1 | 8/2007 | Prahlad et al. |
| 2007/0196013 | A1 | 8/2007 | Li et al. |
| 2007/0198523 | A1 | 8/2007 | Hayim |
| 2007/0291049 | A1 | 12/2007 | Edwards et al. |
| 2008/0005195 | A1 | 1/2008 | Li |
| 2008/0075360 | A1 | 3/2008 | Li et al. |
| 2008/0276176 | A1 | 11/2008 | Wahba et al. |
| 2009/0049064 | A1 | 2/2009 | Alquier et al. |
| 2009/0051826 | A1 | 2/2009 | Chang |
| 2009/0077261 | A1 | 3/2009 | Broadhurst |
| 2009/0116752 | A1 | 5/2009 | Isomura et al. |
| 2009/0252413 | A1 | 10/2009 | Hua et al. |
| 2010/0082672 | A1 | 4/2010 | Kottomtharayil et al. |
| 2010/0082713 | A1 | 4/2010 | Frid-nielsen et al. |
| 2010/0088297 | A1 | 4/2010 | Kiilerich et al. |
| 2010/0088605 | A1* | 4/2010 | Livshin ............... G06T 11/60 715/731 |
| 2010/0092076 | A1 | 4/2010 | Iofis |
| 2010/0158380 | A1 | 6/2010 | Neville et al. |
| 2010/0289818 | A1 | 11/2010 | Hirooka |
| 2010/0332401 | A1 | 12/2010 | Prahlad et al. |
| 2011/0058736 | A1 | 3/2011 | Tokunaga et al. |
| 2011/0125722 | A1 | 5/2011 | Rao et al. |
| 2011/0131341 | A1 | 6/2011 | Yoo et al. |
| 2011/0157221 | A1 | 6/2011 | Ptucha et al. |
| 2011/0221764 | A1 | 9/2011 | Callens et al. |
| 2011/0234613 | A1* | 9/2011 | Hanson ............... G06F 16/58 345/589 |
| 2011/0243453 | A1 | 10/2011 | Kashima et al. |
| 2011/0246893 | A1 | 10/2011 | Paas et al. |
| 2011/0280476 | A1 | 11/2011 | Berger et al. |
| 2012/0105467 | A1 | 5/2012 | Chao et al. |
| 2012/0106859 | A1 | 5/2012 | Cheatle |
| 2012/0185448 | A1 | 7/2012 | Mensch et al. |
| 2012/0275704 | A1 | 11/2012 | Cok et al. |
| 2013/0028521 | A1 | 1/2013 | Yabu |
| 2013/0111373 | A1 | 5/2013 | Kawanishi et al. |
| 2013/0124980 | A1 | 5/2013 | Hudson et al. |
| 2013/0239002 | A1 | 9/2013 | Maloney et al. |
| 2013/0279773 | A1 | 10/2013 | Masumoto et al. |
| 2014/0195575 | A1 | 7/2014 | Haustein et al. |
| 2014/0282009 | A1 | 9/2014 | Avrahami |
| 2015/0046791 | A1 | 2/2015 | Isaacson |
| 2015/0095385 | A1 | 4/2015 | Mensch et al. |
| 2015/0113411 | A1 | 4/2015 | Underwood et al. |
| 2015/0277726 | A1 | 10/2015 | Maloney et al. |
| 2015/0310124 | A1 | 10/2015 | Ben-Aharon et al. |
| 2016/0171954 | A1 | 6/2016 | Guo |
| 2016/0179826 | A1 | 6/2016 | Batra |
| 2017/0026552 | A1 | 1/2017 | Tomono |
| 2017/0139930 | A1 | 5/2017 | Maloney |
| 2017/0139978 | A1 | 5/2017 | Hayworth et al. |
| 2017/0140241 | A1 | 5/2017 | Maloney et al. |
| 2017/0140250 | A1 | 5/2017 | Maloney et al. |
| 2020/0104277 | A1 | 4/2020 | Maloney |

FOREIGN PATENT DOCUMENTS

| | | |
|---|---|---|
| CN | 101539931 A | 9/2009 |
| CN | 101779244 A | 7/2010 |
| CN | 102611693 A | 7/2012 |
| CN | 102930522 A | 2/2013 |
| CN | 102945226 A | 2/2013 |
| EP | 1085464 A2 | 3/2001 |
| EP | 1657648 A2 | 5/2006 |
| EP | 2503759 A1 | 9/2012 |
| EP | 3119062 A1 | 1/2017 |
| WO | 9519003 A1 | 7/1995 |
| WO | 0193563 A2 | 12/2001 |
| WO | 2006123328 A1 | 11/2006 |
| WO | 2006126628 A1 | 11/2006 |
| WO | 2009085526 A1 | 7/2009 |
| WO | 2012047253 A2 | 4/2012 |
| WO | 2013059545 A1 | 4/2013 |
| WO | 2014015081 A2 | 1/2014 |
| WO | 2014131194 A1 | 9/2014 |

OTHER PUBLICATIONS

"Non-Final Office Action Issued in U.S. Appl. No. 15/081,270", dated Nov. 29, 2018, 14 Pages.

"Final Office Action Issued in U.S. Appl. No. 15/081,111", dated May 2, 2019, 14 Pages.

"Final Office Action Issued in U.S. Appl. No. 15/081,270", dated May 6, 2019, 12 Pages.

"About Layouts", Retrieved From https://web.archive.org/web/20130405090952/http://office.microsoft.com/en-in/powerpoint-help/about-layouts-HP003082915.aspx, Retrieved on Mar. 26, 2013, 1 Page.

Tridgell, et al., "The Rsync Algorithm", In Technical Report TR-CS-96-05 of the Australian National University, Jun. 18, 1996, 8 Pages.

"Leading the Way in Microsoft Office Development", Retrieved From https://bettersolutions.com/powerpoint/PIZ113/YU112210331.htm, Retrieved on Mar. 26, 2013, 2 Pages.

"Non Final Office Action Issued in U.S. Appl. No. 11/152,755", dated Sep. 4, 2008, 7 Pages.

(56) References Cited

OTHER PUBLICATIONS

"Final Office Action Issued in U.S. Appl. No. 13/925,114", dated Oct. 12, 2016, 18 Pages.
"Non Final Office Action Issued in U.S. Appl. No. 13/925,114", dated Mar. 10, 2016, 14 Pages.
"Final Office Action Issued in U.S. Appl. No. 15/081,351", dated Jun. 28, 2018, 15 Pages.
"Non Final Office Action Issued in U.S. Appl. No. 15/081,351", dated Oct. 19, 2017, 14 Pages.
"Non Final Office Action Issued in U.S. Appl. No. 15/081,416", dated Mar. 10, 2017, 14 Pages.
"First Office Action and Search Report Issued in Chinese Patent Application No. 201480036154.4", dated Nov. 16, 2017, 12 Pages.
"Second Office Action Issued in Chinese Patent Application No. 201480036154.4", dated Jul. 16, 2018, 6 Pages.
Abela, "Announcing the Slide Chooser", Retrieved From http://extremepresentation.typepad.com/blog/2015/01/announcing-the-slide-chooser.html, Jan. 14, 2015, 4 Pages.
Athitsos, et al., "Distinguishing Photographs and Graphics on the World Wide Web", In Proceedings of IEEE Workshop on Content-Based Access of Image and Video Libraries, Jun. 20, 1997, 7 Pages.
Behera, et al., "Combining Color and Layout Features for the Identification of Low-Resolution Documents", In International Journal of Signal Processing, vol. 2, Issue 1, Mar. 2005, 8 Pages.
Chen, et al., "Artistic Image Analysis using the Composition of Human Figures", In Proceedings of European Conference on Computer Vision, Sep. 6, 2014, 15 pages.
Chen, et al., "Identifying Computer Graphics Using HSV Color Model and Statistical Moments of Characteristic Functions", In Proceedings of IEEE International Conference on Multimedia and Expo, Jul. 2, 2007, 4 Pages.
Deng, et al., "Color Image Segmentation", In Proceedings of Conference on Computer Vision and Pattern Recognition, vol. 2, Jun. 23, 1999, 6 Pages.
Dogar, et al., "Ditto—A System for Opportunistic Caching in Multi-Hop Wireless Networks", In Proceedings of 14th ACM International Conference on Mobile Computing and Networking, Sep. 14, 2008, pp. 279-290.
Krinidis, et al., "An Unsupervised Image Clustering Method Based on EEMD Image Histogram", In Journal of Information Hiding and Multimedia Signal Processing, vol. 3, No. 2, Apr. 2012, pp. 151-163.
Luo, et al., "Natural Scene Classification using Overcomplete ICA", In Journal of Pattern Recognition, vol. 38, No. 10, Oct. 2005, pp. 1507-1519.
Morse, et al., "Image-Based Color Schemes", In Proceedings of IEEE International Conference on Image Processing, vol. 3, Sep. 16, 2007, 4 Pages.
Muthitacharoen, et al., "A Low-Bandwidth Network File System", In Proceedings of the ACM Symposium on Operating Systems Principles, Oct. 21, 2001, 14 Pages.
Ng, et al., "Classifying Photographic and Photorealistic Computer Graphic Images using Natural Image Statistics", In Advent Technical Report #220-2006-6, Oct. 2004, 20 Pages.
Park, et al., "Supporting Practical Content-Addressable Caching with CZIP Compression", In Proceedings of USENIX Annual Technical Conference, Jun. 17, 2007, 24 Pages.
"International Preliminary Report on Patentability Issued in PCT Application No. PCT/US2014/041025", dated Oct. 7, 2015, 8 Pages.
"International Search Report and Written Opinion Issued in PCT Application No. PCT/US2014/041025", dated Nov. 26, 2014, 9 Pages.
"Second Written Opinion Issued in PCT Application No. PCT/US2014/041025", dated Jun. 5, 2015, 7 Pages.
"International Search Report and Written Opinion Issued in PCT Application No. PCT/US2016/060414", dated Mar. 2, 2017, 13 Pages.
"Second Written Opinion Issued in PCT Application No. PCT/US2016/060414", dated Sep. 11, 2017, 8 Pages.
"International Preliminary Report on Patentability Issued in PCT Application No. PCT/US2016/060416", dated Oct. 18, 2017, 12 Pages.
"International Search Report and Written Opinion Issued in PCT Application No. PCT/US2016/060416", dated Mar. 2, 2017, 23 Pages.
"Second Written Opinion Issued in PCT Application No. PCT/US2016/060416", dated Jul. 31, 2017, 11 Pages.
"International Preliminary Report on Patentability Issued in PCT Application No. PCT/US2016/060424", dated Sep. 22, 2017, 6 Pages.
"International Search Report and Written Opinion Issued in PCT Application No. PCT/US2016/060424", dated Feb. 1, 2017, 13 Pages.
"International Preliminary Report on Patentability Issued in PCT Application No. PCT/US2016/060498", dated Sep. 28, 2017, 7 Pages.
"International Search Report and Written Opinion Issued in PCT Application No. PCT/US2016/060498", dated Feb. 8, 2017, 11 Pages.
"International Preliminary Report on Patentability Issued in PCT Application No. PCT/US2016060414", dated Jan. 4, 2018, 9 Pages.
Prabhakar, et al., "Picture-Graphics Color Image Classification", In Proceedings of International Conference on Image Processing, vol. 2, Sep. 22, 2002, 4 Pages.
"Create a Slide Layout that Meets your Needs", Retrieved From https://support.office.com/en-us/article/Create-a-slide-layout-that-meets-your-needs-f881f3a5-522b-4ff8-a496-10a74771a14c, Retrieved on Oct. 28, 2015, 2 Pages.
"Office Action Issued in European Patent Application No. 14735771.9", dated Mar. 20, 2019, 9 Pages.
"Notice of Allowance Issued in U.S. Appl. No. 15/081,270", dated Jul. 29, 2019, 9 Pages.
"Notice of Allowance Issued in U.S. Appl. No. 15/081,111", dated Sep. 9, 2019, 9 Pages.
"Office Action Issued in European Patent Application No. 16805590.3", dated Oct. 14, 2019, 05 Pages.
"Office Action Issued in European Patent Application No. 14735771.9", dated Dec. 19, 2019, 7 Pages.
"First Office Action and Search Report Issued in Chinese Patent Application No. 201910111027.0", dated Jun. 12, 2020, 15 Pages.
"First Office Action and Search Report Issued in Chinese Patent Application No. 201680066194.2", dated Jul. 3, 2020, 14 Pages.

* cited by examiner

AUTOMATIC PRESENTATION OF SLIDE DESIGN SUGGESTIONS

CROSS REFERENCE TO RELATED APPLICATION

The present application is a continuation of U.S. patent application Ser. No. 13/925,114, filed Jun. 24, 2013, now U.S. Pat. No. 10,282,075, which application is hereby incorporated by reference in its entirety.

BACKGROUND

Presentation editors typically do not offer a robust method for placing content on slides and it is often challenging for presentation creators to envision alternative suggestions regarding where to effectively organize slide content. Such organization is vital for conveying a message to the presentation viewer, making effective use of the slide space, and making presentations more visually interesting. Current presentation editors provide an inflexible and limited tool to organize content on slides. For example, presentation editors simply provide a few slide layouts (also referred to as "slide formats") from which to choose and only allow users to add content according to the slide format provided. Thus, reorganizing the slide requires selecting a new slide format and re-adding content.

It is with respect to these and other general considerations that embodiments have been made. Also, although relatively specific problems have been discussed, it should be understood that the embodiments should not be limited to solving the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present disclosure provide a method and system for quickly organizing content on slides by analyzing inserted content and thereafter offering alternative solutions for placing content on a slide in an effective and visually interesting organization. For example, a presentation editor may initially prompt a creator to insert content. The presentation editor may then analyze the content by running analytics such as, but not limited to, facial recognition, content analysis on the slide, background recognition, analysis of content on other slides, user history, rules and heuristics related to content, invariant region recognition on images, or other data in order to determine slide design suggestions. In some embodiments, these analytics may be performed to assist in placing additional content on the slide, such as text on a background area of an accompanying image. The presentation editor may further offer alternative design suggestions for organizing the content on a slide, wherein the alternative design suggestions are placed within the current slide or are easily accessible for selection. A presentation creator may then simply select an alternative design suggestion and automatically receive a newly organized slide including the inserted content without having to manually re-insert and/or reorganize the content. Accordingly, embodiments of the present disclosure enable a presentation creator to efficiently organize content on slides while making effective use of the slide space.

By automatically offering slide design suggestions based on analysis, various technical advantages may be achieved. For example, user efficiency may be increased because a correct slide design suggestion may be quickly selected. In addition, processor cycles may be ultimately reduced because time selecting different designs in an editor may be reduced. Still further, errors may be reduced because appropriate slide designs may be automatically available after analysis.

Embodiments may be implemented as a computer process, a computing system or as an article of manufacture such as a computer program product or computer readable media. The computer program product may be computer storage media readable by a computer system and encoding a computer program of instructions for executing a computer process.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
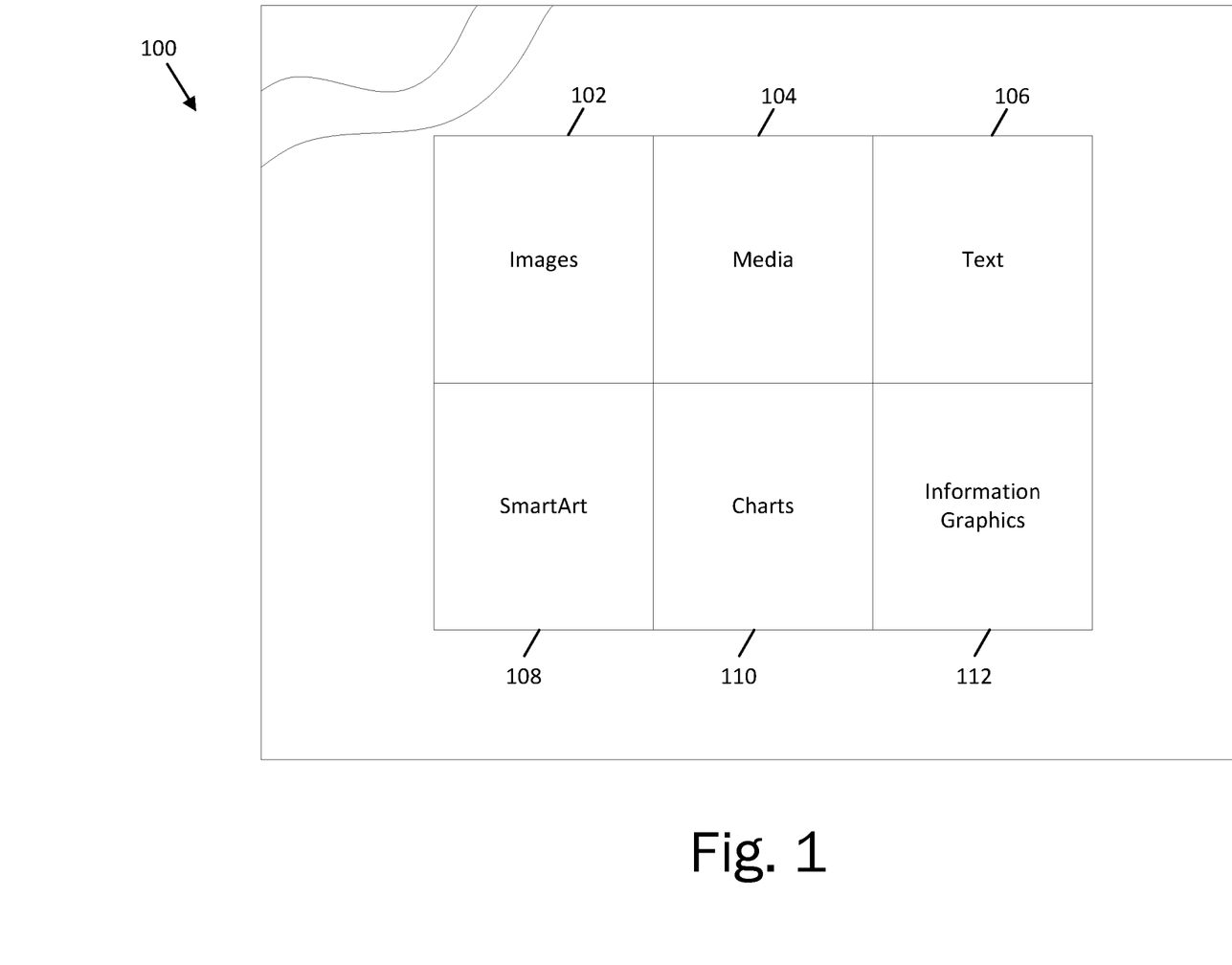
FIG. 1 illustrates a main selection page of a presentation application.

FIG. 1 illustrates a main selection page 100 of a presentation application. As shown, the main selection page 100 includes a plurality of content types that can be inserted into a presentation. In this example, the content types shown include: images 102, media 104, text 106, SmartArt® 108, charts 110, and information graphics 112. In other examples, other content types may be shown. In this example, this main selection page 100 is used to select what type of content to display on a slide or slides. Also, each content type is linkable to a directory. For example, clicking on the 'Charts' content type 110 will make a selection of charts available for the user to insert. Such a selection of charts includes, but is not limited to, bar graphs, pie charts, scatter plots, pictographs, flow charts, and line graphs. A main selection page 100 may also show mixtures of content types. For example, main selection page 100 may offer a choice of text 106 with charts 110. Any permutation of content type may be offered on main selection page 100.

Figure 2:
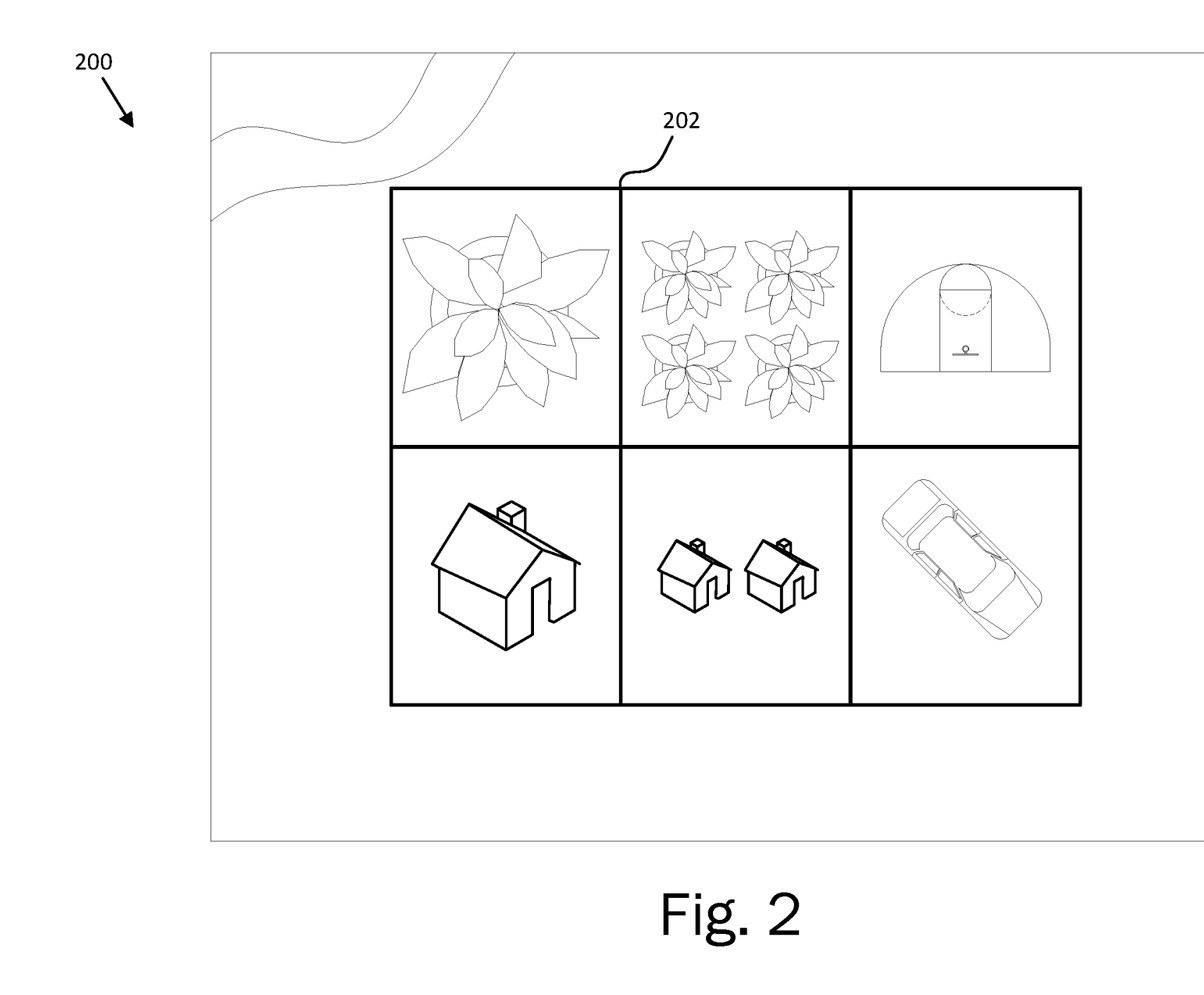
FIG. 2 illustrates an image gallery page of a presentation application.

FIG. 2 illustrates an image gallery page 200 of a presentation application. In this example, if a user selects the 'Images' content type 102 from the main selection page as shown and described with reference to FIG. 1, an example image gallery 200 may appear. While a two row, three column image gallery 202 is shown, it is understood that alternative methods of displaying images are included within the disclosure. In this example, six images are included in the image gallery 200. In some embodiments, users place images in a folder from where the presentation application can retrieve images. Alternatively, a user may upload these images directly to the gallery. Still further, a user may select an image stored in a "cloud" data center or elsewhere on the internet. A user can select an image by double clicking on the image or by right clicking on the image and selecting the image. In other embodiments, a user can click on an image and select a button to generate that image on a slide. Yet in other embodiments, a user can drag and drop, copy and paste, or simply upload content to a slide.

Figure 3:
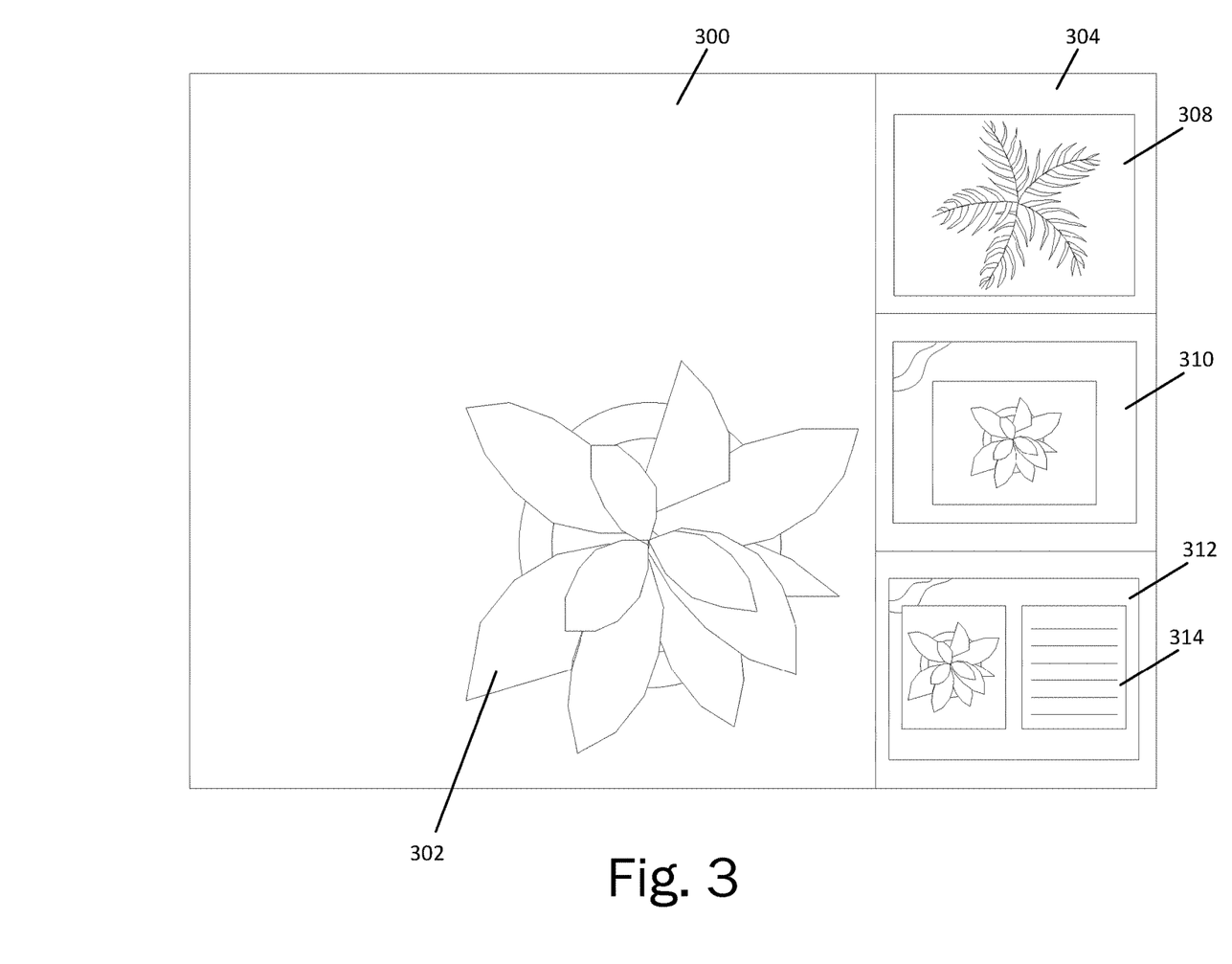
FIG. 3 illustrates a slide and slide design suggestions, the slide design suggestions showing variations of content placeholder types and content placeholder size.

FIG. 3 illustrates a slide 300 including an image 302 of a flower, selected from the image gallery 202. The slide 300 further includes slide design suggestions area 304 shown as a vertical bar on the right side of the slide 300. However in other embodiments, a slide design suggestions area 304 is shown as a drop down menu, an alternative window, or placed horizontally above or below the slide. Still further, slide design suggestions area 304 may be located elsewhere.

In this example, if a user selects the image 302 shown in the image gallery 202 in FIG. 2, then the presentation application automatically places the image 302 on the slide 300. As shown in this example, the presentation application placed the image 302 on the right side of the slide 300 by default. In other examples, the presentation application may place the selected image 302 on other areas of the slide 300 such as the left, middle, top, and/or bottom of the slide 300. Still further, the presentation application may place a border around the selected image 302.

Referring still to FIG. 3, placement of the image 302 on the slide 300 may depend on various factors such as, but not limited to placement of the content placeholder, the type of content placeholder, the content placeholder size, and the size of the content inserted. The factors may be used in the analysis of slide design suggestions to suggest. The presentation application may further determine areas of interest within the image and place the image on the slide 300 accordingly. For example, if the image 302 is of a person and a background, then the presentation application may determine the area(s) of interest, such as the person's face. The presentation application may then suitably place the image on the slide 300 so that the person's face is placed in an unobstructed area on the slide 300. For example, if an image includes a person and a background, the presentation application may suitably place the image on the slide so that the person's face is not obstructed from additional content, such as text on the slide 300. In the example of FIG. 3, the content itself was analyzed so that the location of the content placeholder, in the lower right corner of the slide, was suggested.

Furthermore, in some embodiments, the presentation application may use the "rule of thirds" to place the object of interest on the far right or far left area of the slide 300 rather than directly in the middle of the slide. The "rule of thirds" is a suggested methodology for placing an image 302 where it is most visually interesting (e.g., on the left or right side rather than directly in the center). For example, placing the image 302 on the right side of the slide 300 enables text to be placed on the left side of the slide 300. Additionally, the presentation application may crop or resize the image 302 before placing it on the slide 300. In the latter case, the content size is adjusted based on the analysis of the content.

The slide 300 also includes slide design suggestions area 304 located on the right side of the slide 300. The slide design suggestions area 304 includes suggested alternative slide designs that can be used in place of slide 300. In this instance, the suggested alternative slide design suggestions are viewable as thumbnails next to the slide 300. Although a thumbnail is discussed, one skilled in the art may envision various alternative methods of displaying generated slide design suggestions, such as in a new window, a drop down menu, nested within a ribbon in the application, etc. Slide design suggestions may include variations of content size, content type, number of content placeholders, suggested content, background to slides, or any other slide design suggestions. Content design suggestions may be based on analysis of content on the current slide, content on the previous or next slide, content within the entire slide deck, user history data, user preferences, rules or heuristics about types of content, or other data.

For example, slide design suggestions can have text, images, charts, video, or any combination thereof. In the example of FIG. 3, the slide design suggestions area 304 includes three alternative slide design suggestions: a slide 308 including a full view of an image that spans the entire slide 308; a slide 310 including the selected image 302 that spans part of the slide 310; and a slide 312 including the content image 302 next to a text box 314. While three alternative slide design suggestions are shown in this example, it is understood that more or fewer alternative slide design suggestions may also be included. In some embodiments, the number of design suggestions depends on the content that is inserted, the content that is already on the slide, the content on other slides in the same slide deck, user history with content, and/or the preferences of the presentation creator.

In some embodiments, the presentation application disclosed herein may analyze the content and thereafter provide additional design suggestions for displaying other content on a slide. For example, if a slide includes statistics in the form of text, the presentation application may analyze the data and provide alternative means of displaying this data on a slide, such as in the form of a graph. As an example, if a quadratic equation had been entered in a text content placeholder, then a content design suggestion may include a chart of a parabola. The presentation application may query a search server for additional content, the content of the same or different content type, to display with or instead of the content. Alternatively or additionally, the presentation application may retrieve related, supplemental data from a repository or a database and insert additional data not included on the slide. For example, the presentation application may include additional statistics, related to content inserted on the slide that is retrieved from a database. As another example, if a presentation creator added a picture of a beach, the presentation application may analyze this picture and suggest alternative pictures of beaches retrieved from a database. Hence, the alternative design suggestions may be used to supplement content on a slide or used to entirely replace content on a slide.

While the slide design suggestions area 304 is located along the right of the slide 300 in the example shown, it is understood that the slide design suggestions area 304 may be positioned along the bottom area, top area, or left area of the slide 300. Alternatively, the slide design suggestions area 304 may be displayed separately from the slide 300, such as in a pop-up window or a floating toolbar.

Figure 4:
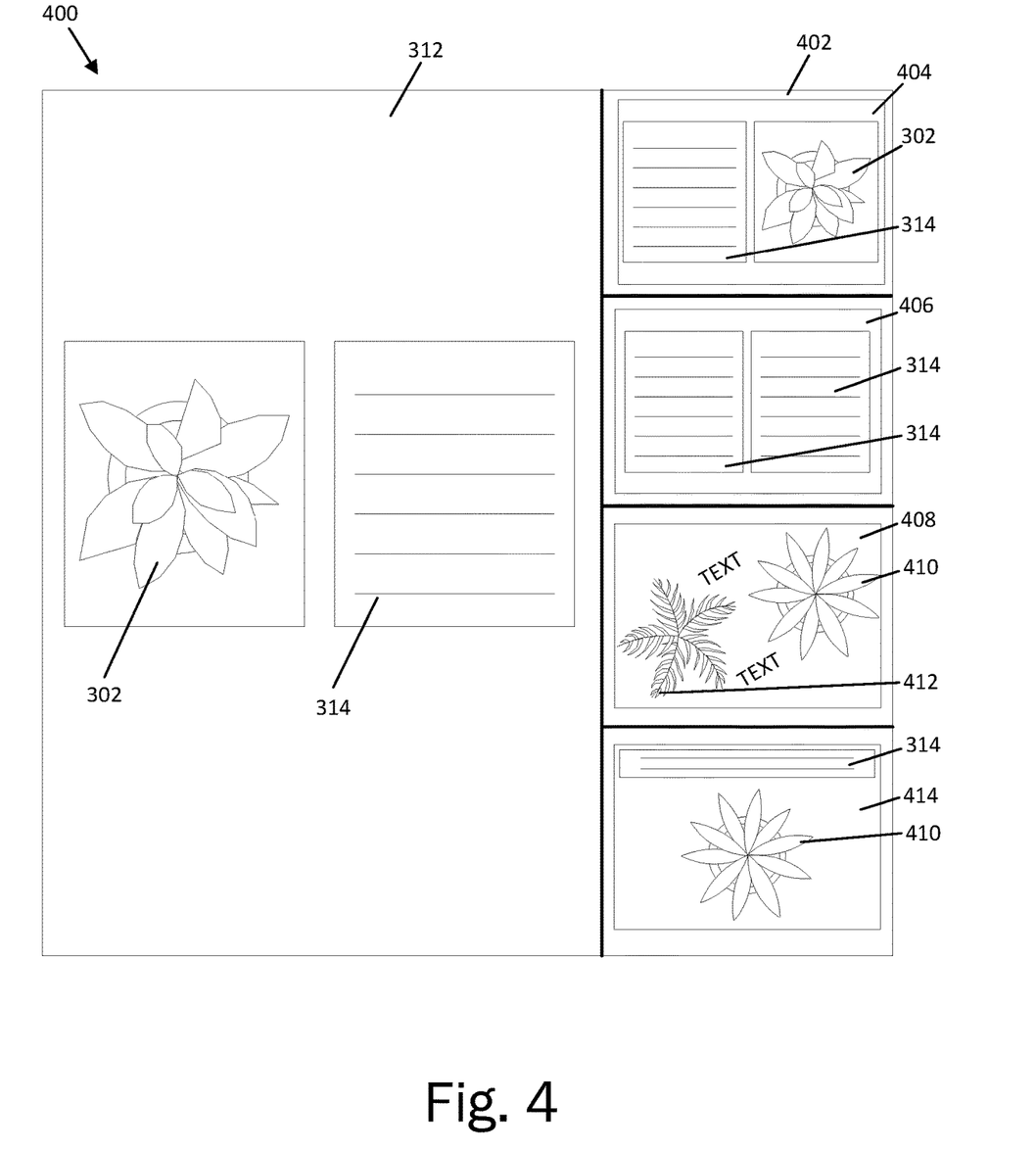
FIG. 4 illustrates a slide and slide design suggestions, the slide design suggestions showing variations of content and content types.

FIG. 4 illustrates a slide and slide design suggestions, the slide design suggestions showing variations of content, content types, content size and content position. Here also, the slide suggestions are made based on analysis of factors such as existing slide content, slide content from other slides in the slide deck, user preferences, rules or heuristics associated with the type of content, etc. In particular, this example illustrates a slide that may result after a user selects the third slide 312 design suggestion as shown and described with reference to FIG. 3. In this example, selected slide 312 includes the selected image 302 and a text box 314. The display of slide 312 further provides an additional slide design suggestions area 402 that include further suggestions for a slide. In this instance, the suggested alternative slide design suggestions are viewable as thumbnails next to the slide 312. Although a thumbnail is discussed, various alternative methods of displaying generated slide design suggestions are possible, such as display in a new window, a drop down menu, nested within a ribbon in the application, etc. In this example, because the user selected the slide 312 that includes two content areas (e.g., image 302 and text box 314), the additional slide design suggestions may include different combinations of the two selected content areas laid out on the slide. For example, slide 404 includes a text box 314 on the left of the selected image 302; slide 406 includes two text boxes 314; slide 408 includes two alternative suggested images 410 and 412 and accompanying text; and slide 414 includes an alternative suggested image 410 and a text box 314 laid horizontally across the top of the slide 412. While four design suggestions for slide designs are shown in this example, it is understood that more or fewer alternative slide designs may also be included.

Notably, the automated system for suggesting individual slide designs may also be used to organize a layout of an existing presentation slide deck. For example, in some embodiments, a presentation creator may open an existing slide deck in the presentation application. The presentation application may then reorganize the content of each slide in the existing slide deck, thereby automatically generating an entirely new slide deck incorporating the content provided in the pre-existing slide deck.

As yet another example, a user may have a quadratic equation on a slide in an existing slide deck, and the presentation application may thereafter insert a parabola representing the equation onto a new slide within the same slide deck. The chart may have a similar background, content placeholder size, and content position as the content placeholder that includes the equation.

Figure 5:
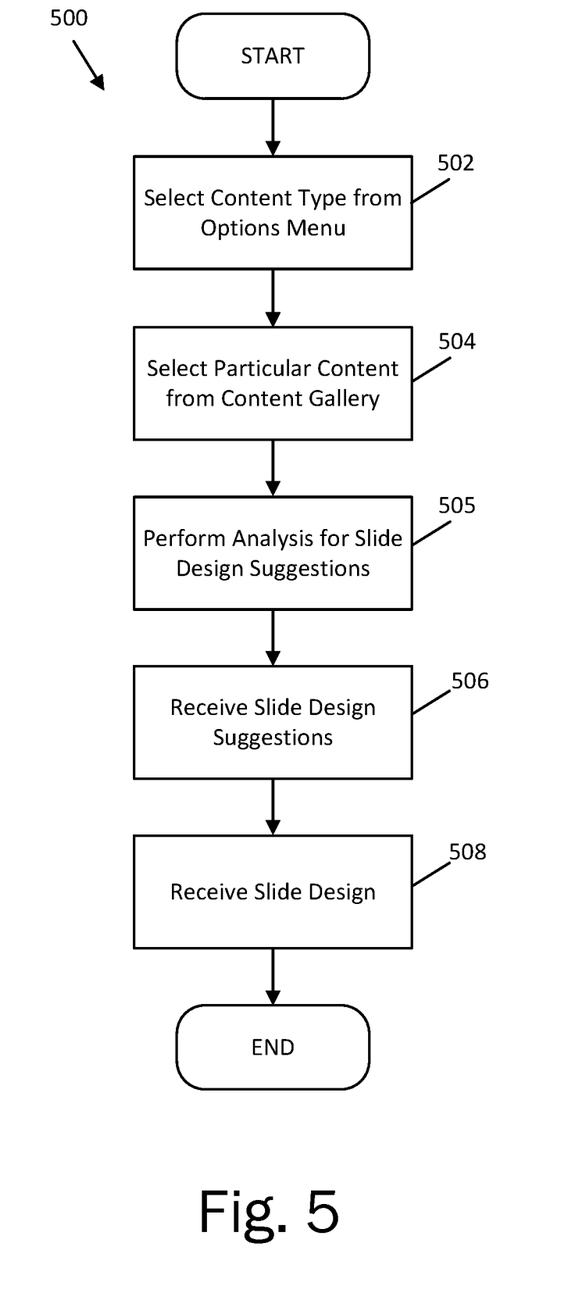
FIG. 5 illustrates a method for organizing a slide using an automatic slide suggestion feature in a presentation application.

FIG. 5 illustrates a method 500 for organizing a slide using an automatic slide design feature in a presentation application. The method 500 begins at operation 502 in which a presentation creator selects a content type from the main selection page of the presentation application. In the illustrated example, the presentation creator selects "Image" from the content type, however alternative content types include, but are not limited to, media, text, SmartArt®, charts, and information graphics. In operation 504, the presentation creator selects a particular content from the content gallery. As shown with reference to FIG. 2, a variety of images are displayed from which the creator may select.

In operation 505, the presentation application performs analysis on the content selected in order to provide slide design suggestions. As discussed above, analysis includes analysis of content on the current slide, content on the previous or next slide, content within the entire slide deck, user history data, user preferences, rules or heuristics about types of content, or other data.

In operation 506, the presentation creator receives automatically generated slide design suggestions, wherein the automatically generated slide design suggestions include a plurality of generated slide designs. As discussed above, a slide design may describe the type of content that is on a slide, the position of content, the size of content, alternative content that may be displayed instead of the selected content or adjacent to the selected content, font size associated with content, background images associated with content, or any other visual variation of the content. For example, slides can have text, images, charts, video, or any combination thereof. In this instance, a slide design suggestion may be viewable in the main slide 300 and the remaining design suggestions may be viewable, for example, as smaller thumbnails, such as those shown in the slide design suggestion area 304.

In operation 508, the presentation creator receives a desired slide design. In operation 508, the presentation creator may select the generated slide that is viewable in the main slide or select another generated slide that is viewable as a smaller thumbnail, such as a slide presented in the slide design suggestions area 304. Thus, in operation 508, the presentation creator receives a slide design.

Figure 6:
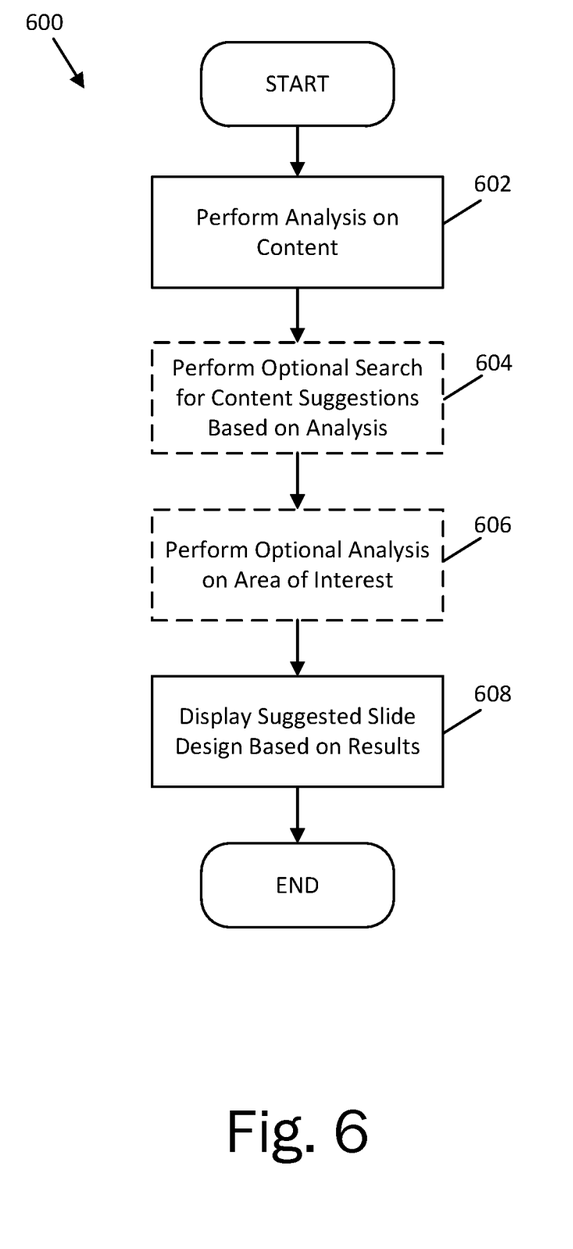
FIG. 6 illustrates a method for automatically organizing a slide and generating slide design suggestions by a presentation application.

FIG. 6 illustrates a method 600 for automatically organizing a slide and generating slide design suggestions by a presentation application. This method begins at operation 602 in which the presentation application performs analysis on inserted content by running analytics such as, but not limited to, facial recognition, content analysis on the slide, background recognition, analysis of content on other slides, user history, rules, and heuristics related to the content, invariant region recognition on images, or other data in order to determine slide design suggestions.

In operation 604 the presentation application may optionally perform a search for content suggestions based on the analysis conducted in operation 602. In some embodiments, the analysis is used to supplement or entirely replace content on a slide by retrieving data not provided by the presentation creator. As an example, if a slide includes statistics in the form of text, the presentation application may analyze the data and provide alternative means of displaying this data on a slide, such as in the form of a graph. As yet another example, if a quadratic equation had been entered in a text content placeholder, then a content design suggestion may include a chart of a parabola. The presentation application may query a search server for additional content, the content of the same or different content type, to display with or instead of the content. Alternatively or additionally, the presentation application may retrieve related, supplemental data from a repository or a database and insert additional data not included on the slide. For example, the presentation application may include additional statistics, related to content inserted on the slide that is retrieved from a database. As another example, if a presentation creator added a picture of a beach, the presentation application may analyze this picture and suggest alternative pictures of beaches retrieved from a database.

In operation 606, the presentation application may optionally perform analysis on an area of interest of the image in order to suitably place the content on the slide. The presentation application may perform facial recognition, determine invariant regions in the image, crop and resize content, and/or determine background shapes in order to effectively place content on a slide so that it is unobstructed from other content. For example, if an image includes a person and a background, the presentation application may suitably place the image on the slide so that the person's face is not obstructed from additional content, such as text on the slide.

In operation 608, the presentation application displays suggested slide designs, from which the user may select, based on results. Operation 608 may involve generating more than one suggested slide design based on the one or more analyses performed in operations 602-606.

Figure 7:
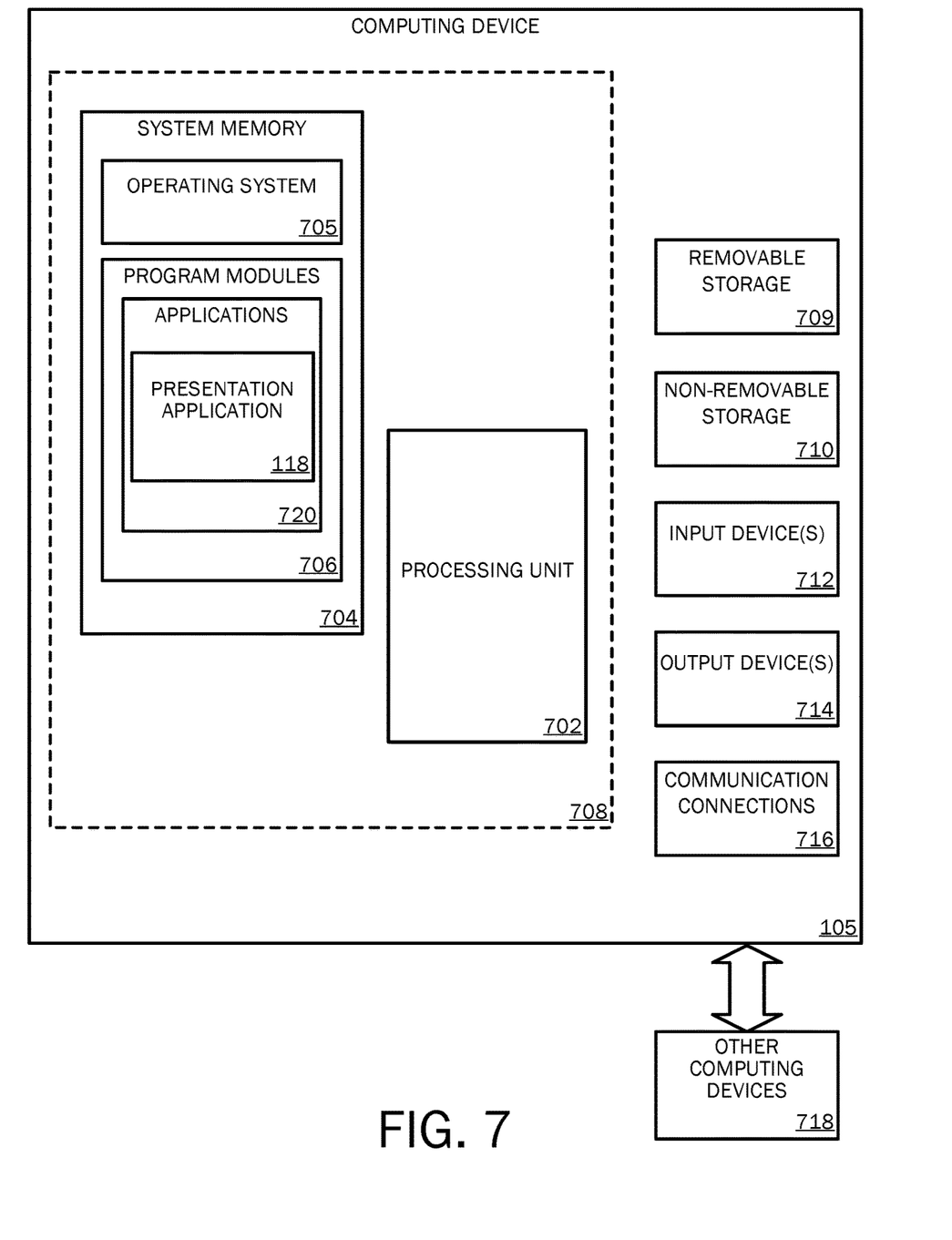
FIG. 7 is a block diagram illustrating example physical components of a computing device with which embodiments of the invention may be practiced.
Figure 8A:
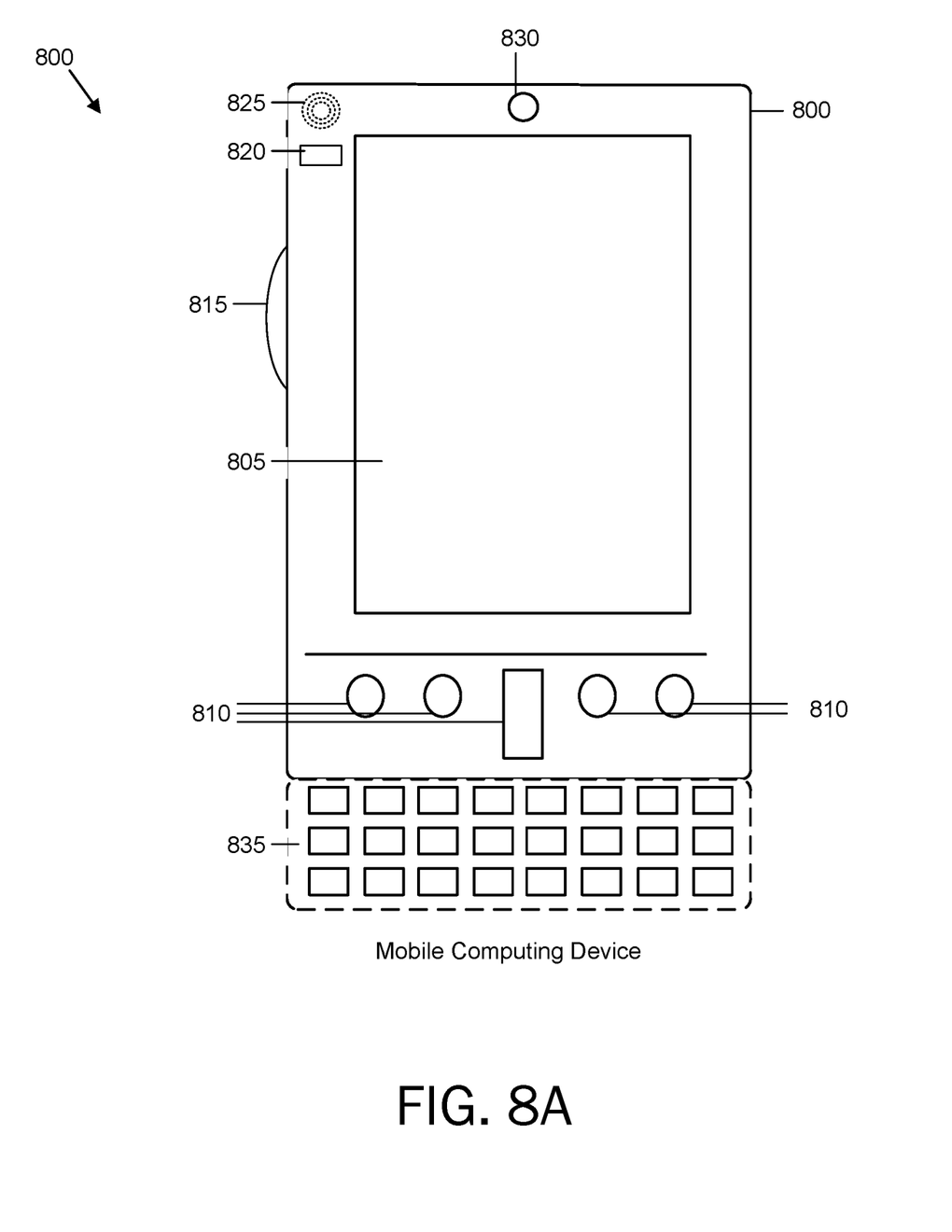
FIG. 8A illustrates one embodiment of a mobile computing device executing one or more embodiments disclosed herein.
Figure 8B:
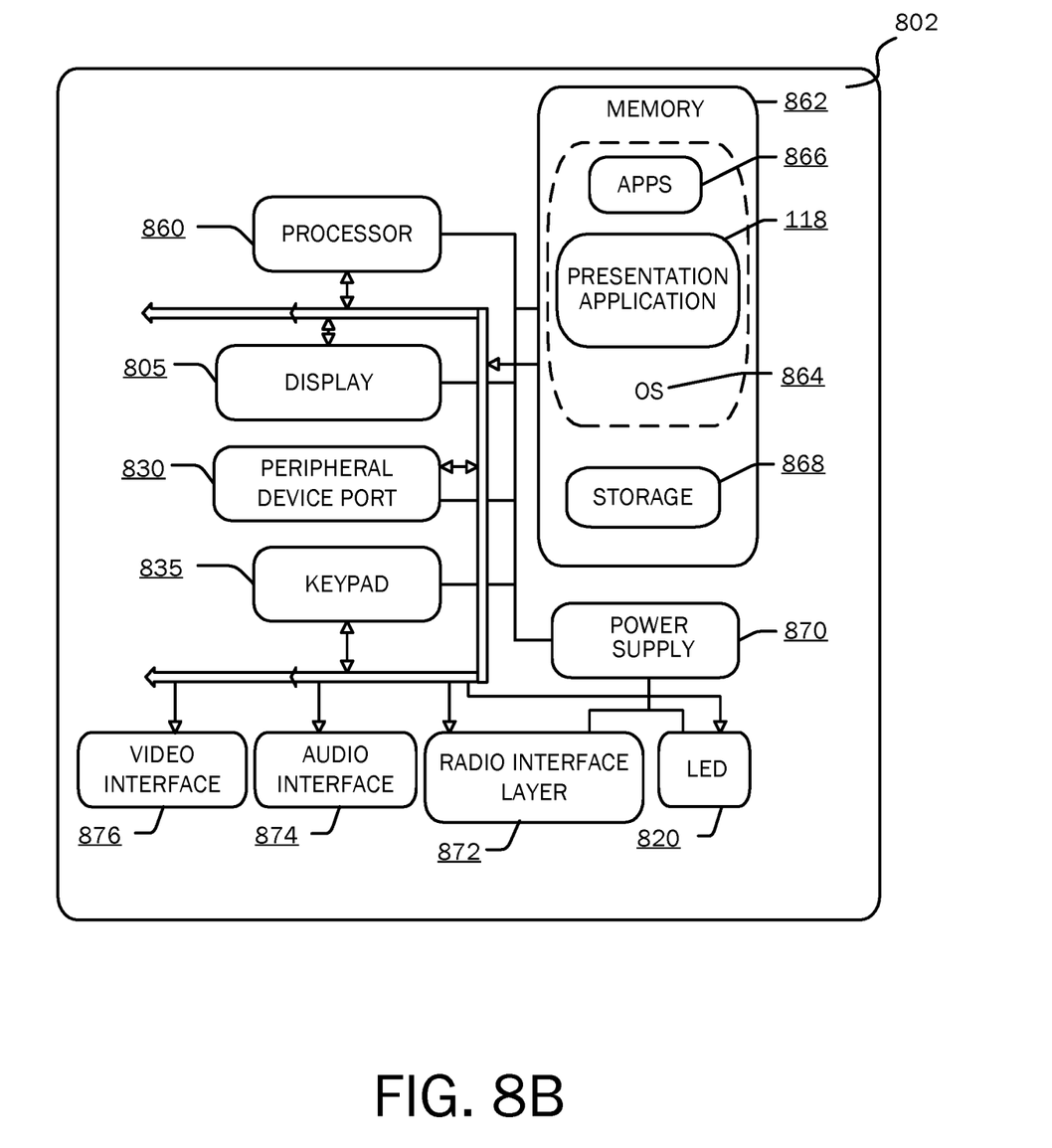
FIG. 8B is a simplified block diagram of a mobile computing device with which embodiments of the present invention may be practiced.
Figure 9:
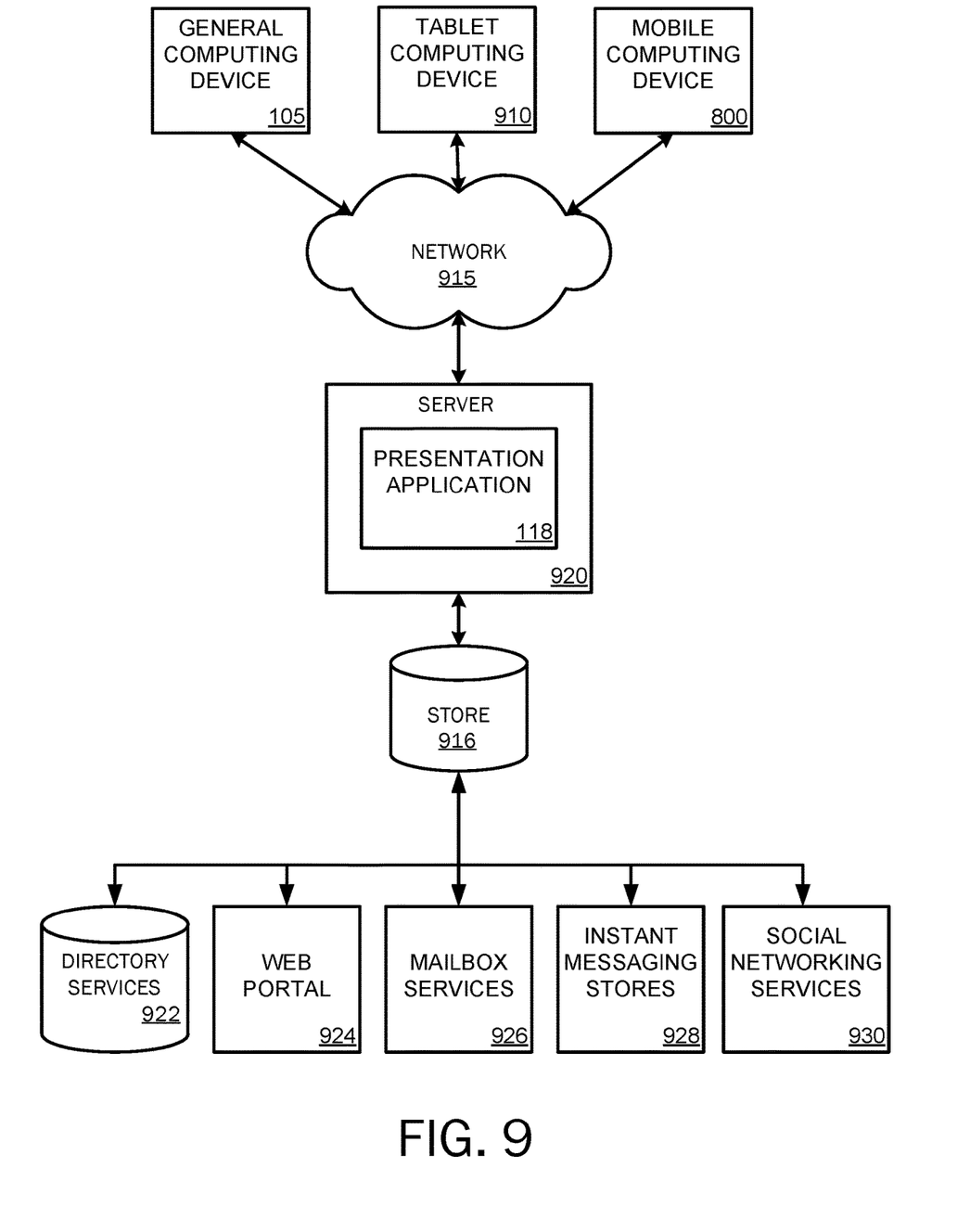
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 105 with which embodiments of the invention may be practiced. The computing device components described below may be suitable for the computing devices described above. In a basic configuration, the computing device 105 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as a presentation application 118. The operating system 705, for example, may be suitable for controlling the operation of the computing device 105. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 105 may have additional features or functionality. For example, the computing device 105 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., the presentation application 118) may perform processes including, but not limited to, one or more of the stages of the methods 500-600 illustrated in FIGS. 5-6. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the presentation application 118 may be operated via application-specific logic integrated with other components of the computing device 105 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 105 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 105 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 105. Any such computer storage media may be part of the computing device 105. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer 610, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the presentation application 118 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing detection and grouping of graphics elements in a fixed format document to one or more client devices, as described above. Content developed, interacted with, or edited in association with the presentation application 118 may be stored in different communication channels or other storage types. For example, various documents may be stored using a directory service 922, a web portal 924, a mailbox service 926, an instant messaging store 928, or a social networking site 930. The presentation application 118 may use any of these types of systems or the like for enabling data utilization, as described herein. A server 920 may provide the presentation application 118 to clients. As one example, the server 920 may be a web server providing the presentation application 118 over the web. The server 920 may provide the presentation application 118 over the web to clients through a network 915. By way of example, the client computing device may be implemented as the computing device 105 and embodied in a personal computer, a tablet computing device 910 and/or a mobile computing device 800 (e.g., a smart phone). Any of these embodiments of the client computing device 105, 610, 800 may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for automatically organizing content on a presentation slide using a presentation editor, comprising:
receiving a selection of first content within a selected content type;
displaying a presentation slide, wherein the presentation slide includes the first content;
in response to receiving the selection of the first content, determining a slide design suggestion, the slide design suggestion including a suggested size of the first content, a suggested location of the first content, and a suggested location of second content associated with the first content;
displaying the slide design suggestion;
receiving a selection of the slide design suggestion; and
displaying the presentation slide according to the selected slide design suggestion.

2. The method of claim 1, wherein the slide design suggestion includes an alternative content to the first content.

3. The method of claim 1, wherein determining the slide design suggestion comprises analyzing any one of content within the presentation slide, content within another slide within a slide deck, user preferences, a background image, or a rule associated with the selected content type.

4. The method of claim 3, wherein the slide design suggestion includes an alternative content to the first content.

5. The method of claim 1, wherein the slide design suggestion is displayed in a thumbnail image.

6. The method of claim 1, further comprising:
automatically determining an area of interest in the first content; and
automatically cropping or resizing the first content to avoid obscuring the area of interest.

7. The method of claim 1, further comprising:
receiving a selection of second content within the selected content type; and
displaying the presentation slide according to the selected slide design suggestion, wherein the presentation slide includes the first content and the second content.

8. A computer-readable storage medium storing instructions for automatically organizing content on a presentation slide using a presentation editor, the instructions when executed causing a computing device to perform operations, comprising:
receiving a selection of first content within a selected content type;
displaying a presentation slide, wherein the presentation slide includes the first content;
in response to receiving the selection of the first content, determining a plurality of slide design suggestions, each of the plurality of slide design suggestions including a suggested size of the first content, a suggested location of the first content, and a suggested location of second content associated with the first content;
displaying the plurality of slide design suggestions;
receiving a selection of one of the plurality of slide design suggestions; and
displaying the presentation slide according to the selected one of the plurality of slide design suggestions.

9. The computer-readable storage medium of claim 8, wherein the plurality of slide design suggestions includes an alternative content to the first content.

10. The computer-readable storage medium of claim 8, wherein determining the plurality of slide design suggestions further comprises analyzing any one of content within the presentation slide, content within another slide within a slide deck, user preferences, a background image, or a rule associated with the selected content type.

11. The computer-readable storage medium of claim 10, wherein the plurality of slide design suggestions includes an alternative content to the selected content type.

12. The computer-readable storage medium of claim 8, wherein the plurality of slide design suggestions are displayed as thumbnail images.

13. The computer-readable storage medium of claim 8, further comprising instructions for:
automatically determining an area of interest in the first content; and
automatically cropping or resizing the first content to avoid obscuring the area of interest.

14. A computing system, comprising:
at least one processor; and
at least one memory storing instructions that, when executed by the at least one processor, cause the computing system to perform a method for automatically organizing content on a presentation slide using a presentation editor, comprising:

receiving a selection of first content within a selected content type;

displaying a presentation slide, wherein the presentation slide includes the first content;

in response to receiving the selection of the first content, determining a slide design suggestion, the slide design suggestion including a suggested size of the first content, a suggested location of the first content, and a suggested location of second content associated with the first content;

displaying the slide design suggestion;

receiving a selection of a slide design suggestion; and displaying the presentation slide according to the selected slide design suggestion.

15. The system of claim 14, wherein the slide design suggestion includes an alternative content to the first content.

16. The system of claim 14, wherein determining the slide design suggestion comprises analyzing any one of content within the presentation slide, content within another slide within a slide deck, user preferences, a background image, or a rule associated with the selected content type.

17. The system of claim 16, wherein the slide design suggestion includes an alternative content to the selected content type.

18. The system of claim 14, wherein the slide design suggestion is displayed as a selectable thumbnail image.

19. The system of claim 14, further comprising instructions for:

automatically determining an area of interest in the first content; and automatically cropping or resizing the first content to avoid obscuring the area of interest.

20. The system of claim 14, further comprising:

receiving a selection of second content within the selected content type; and displaying the presentation slide according to the selected slide design suggestion, wherein the presentation slide includes the first content and the second content.

\* \* \* \* \*